Patented Nov. 19, 1946

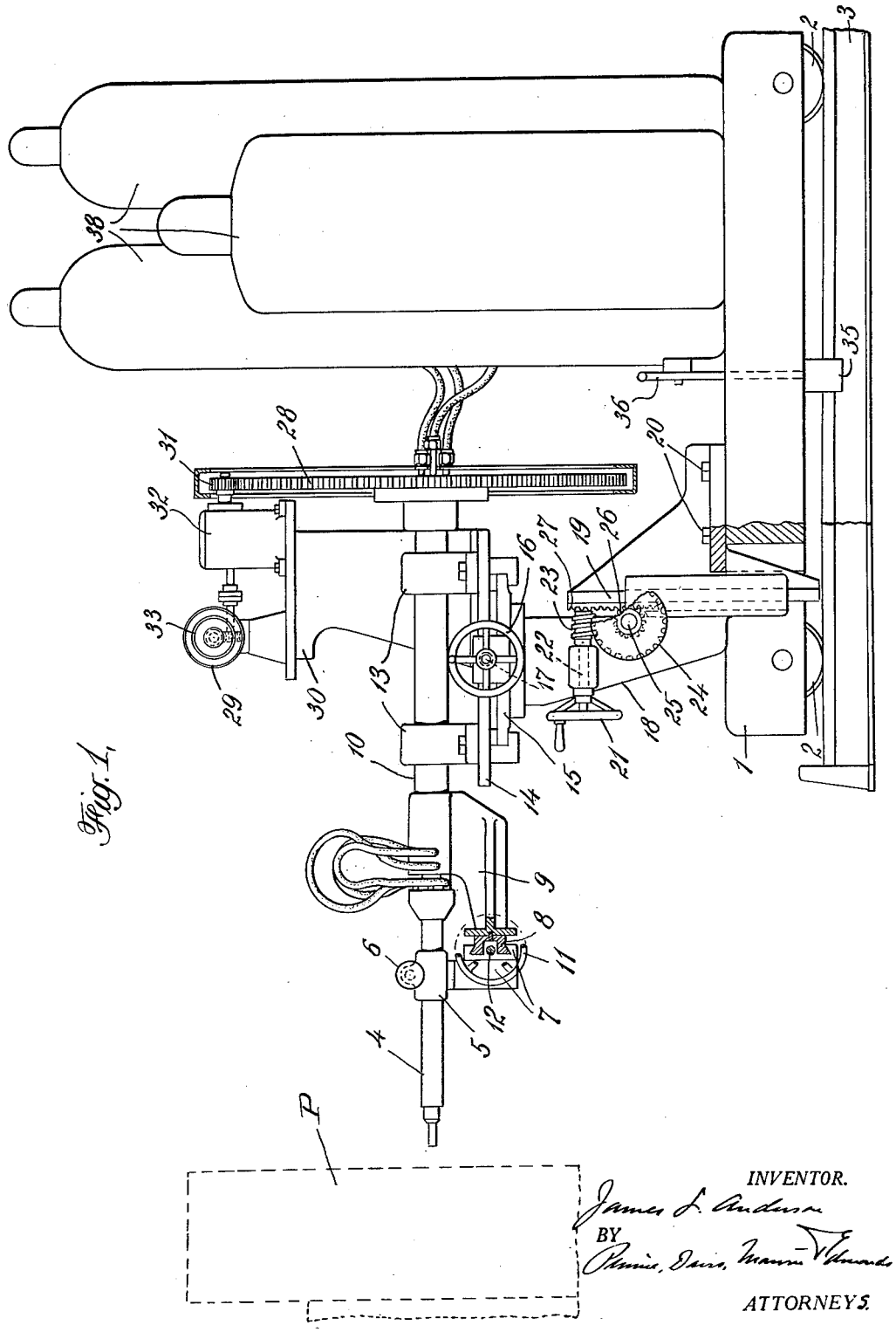

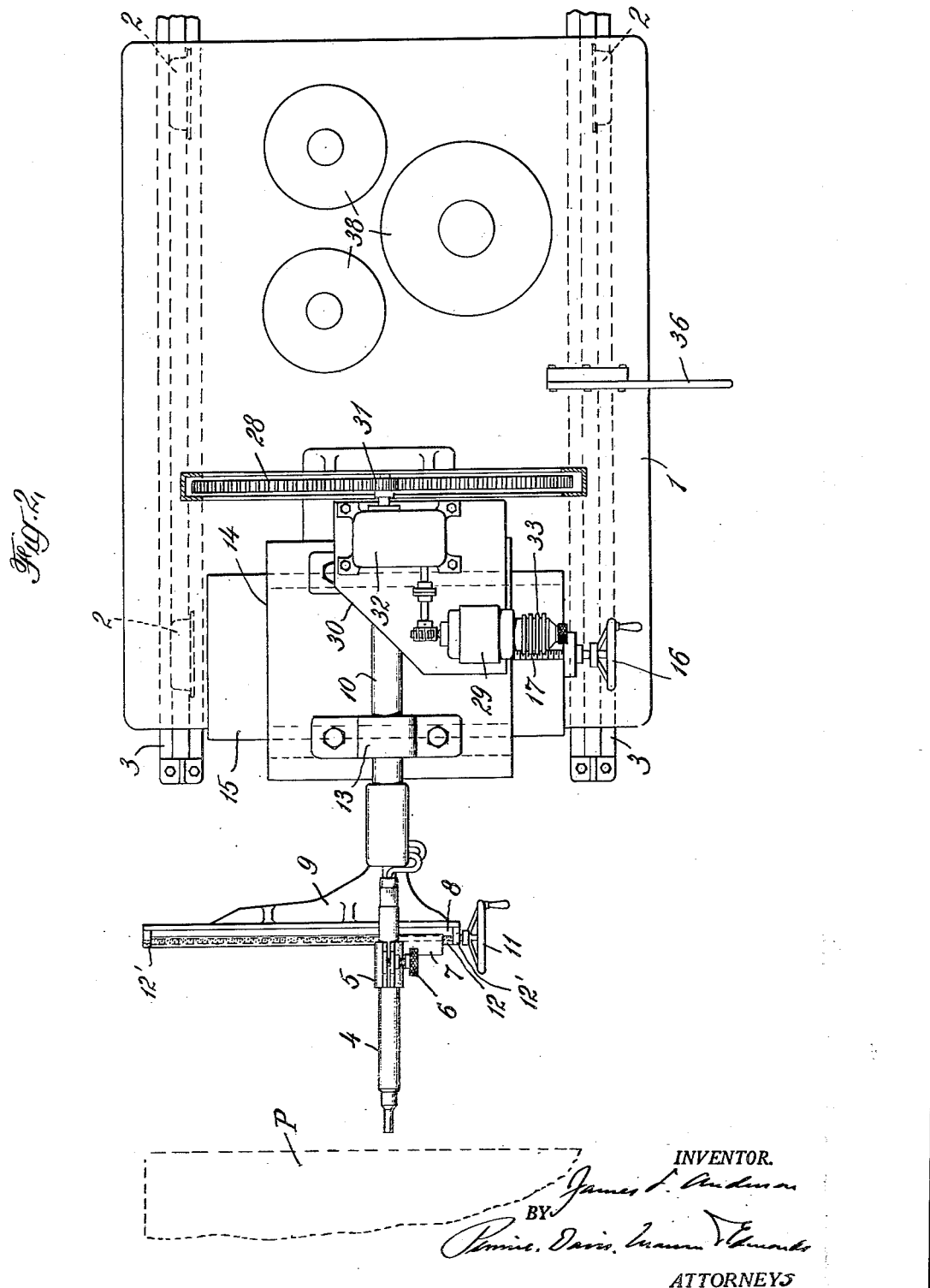

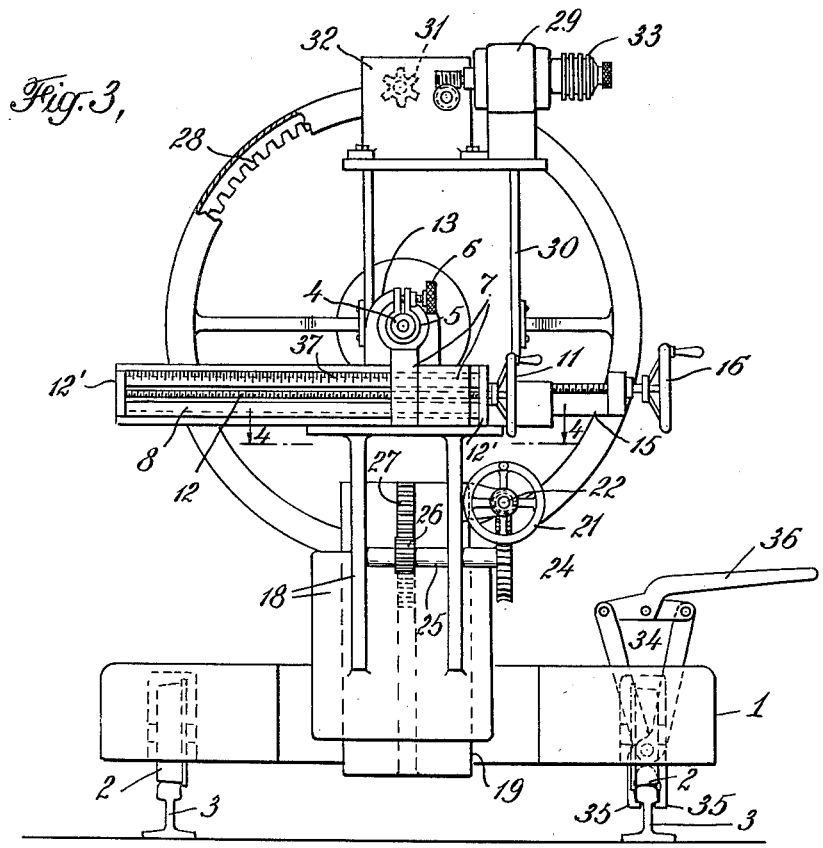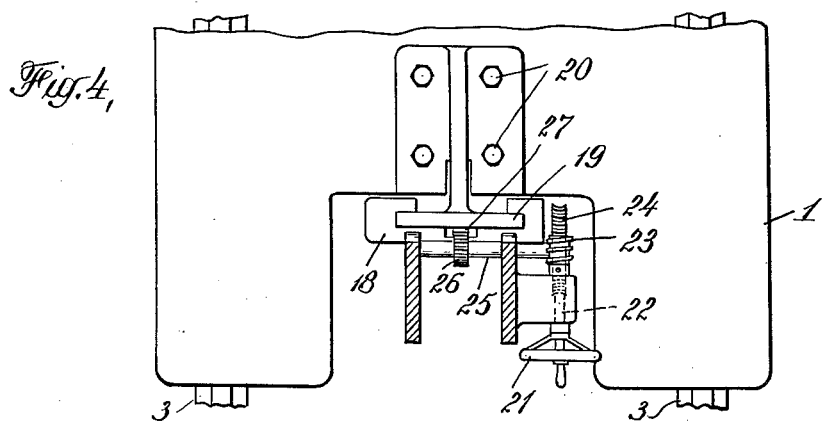

2,411,182

UNITED STATES PATENT OFFICE 2,411,182

CIRCLE CUTTING MACHINE

James L. Anderson, Closter, N. J., assignor to Air Reduction Company, Incorporated, a corporation of New York Application April 11, 1944, Serial No. 530,513

2 Claims. (Cl. 33—27)

This invention relates to apparatus for thermochemically cutting metal, and more particularly to apparatus for making circular or arcuate cuts in metal plates or other work-pieces by means of a gas cutting torch, such as an oxyacetylene torch.

One object of the invention is to provide improved apparatus of this kind which is simple and rugged in character and which is capable of a number of easily made adjustments or movements to facilitate making a circular or arcuate cut of the desired radius at the proper place on the plate or other work-piece.

Another object is to provide improved thermochemical cutting apparatus which is particularly adapted for use in cutting circular openings, such as port holes, in a metal plate while the plate is in a vertical position.

The apparatus in its preferred form is adapted to cut in a vertical plane so that circular openings or arcuate cuts may be made in a metal plate or the like while it is in a vertical position. In such an apparatus all of the parts are mounted on a carriage which is movable horizontally toward the vertical plate to bring the torch into cutting relation with the plate. The torch is supported by a rotary horizontal shaft such that the longitudinal axis of the torch is normally an extension of the longitudinal axis of the shaft and in alignment with it. The shaft is capable of lateral adjustment either in a horizontal plane or a vertical plane whereby the tip of the torch may be brought to the center of the proposed circular cut. Lateral adjustability of the torch with respect to its supporting shaft permits the torch to be then moved off center a distance equal to the radius of the proposed circular cut so that when the torch is subsequently revolved bodily about the axis of its supporting shaft a circular cut of the desired radius will be cut in the plate.

Apparatus embodying the invention is illustrated in the accompanying drawings, in which:

Figure 1 is a side elevation of the apparatus;

Fig. 2 is a plan view of the apparatus shown in Fig. 1;

Fig. 3 is a front elevation, partly in section, of the apparatus shown in Fig. 1; and Fig. 4 is a horizontal section taken on the line 4—4 of Fig. 3.

The apparatus comprises a carriage 1 provided with wheels 2 adapted to run on a track 3. The carriage is movable along the track to bring the gas cutting torch 4, such as an oxyacetylene torch, into cutting relation with the metal plate to be cut represented at P. The torch is mounted in a holder 5. This holder may be of the type in which the torch is adjustable longitudinally by turning a knob to rotate a pinion engaging with a rack on the torch in a well-known manner, or it may be in the nature of a split sleeve, such as shown in the drawing, in which the torch may be longitudinally adjusted and then clamped in position by turning the knob 6 to clamp the split sleeve to the torch. The torch holder 5 is rigidly attached to a slide 7 (see also Fig. 3) which is adapted to be adjusted transversely along a horizontal guide 8 whose longitudinal axis is disposed at right angles to the longitudinal axis of the torch. The guide 8 is carried by the forward end of a bracket 9 (Fig. 1) which extends back to the forward end of a horizontal rotatable shaft 10 where it is rigidly secured to this shaft. Adjustment of the slide 7 along the guide 8 may be effected by turning a hand-wheel 11 fastened to a screw shaft 12. The screw shaft is journalled at its end in bearing blocks 12' (Figs. 2 and 3) secured to the bracket 9 at the ends of the guide 8 and has threaded engagement with a portion of the slide 7 as shown in Fig. 1.

As will be seen from Fig. 1 the bracket 9, when rotated by the shaft 10 to its lowermost position shown in this figure, supports the torch so that its longitudinal axis is in the same horizontal plane as the longitudinal axis of the shaft 10. Thus by turning the hand-wheel 11 to adjust the slide 7 and the torch holder along the guide 8 the torch may be brought into coaxial relation with the shaft 10 with the axis of the torch in alignment with the axis of the shaft. However, the torch 4 may be shifted laterally by turning the hand-wheel 11 so that its axis is then laterally offset with respect to the axis of the shaft. In other words, the torch may be brought into eccentric relation with respect to the shaft.

The shaft 10 is journalled in bearings 13 (Fig. 1) mounted on a plate 14 which is adjustable horizontally and transversely on a guide 15 (Figs. 1 and 2). Adjustment of the plate 14 on the guide 15 may be effected by turning a hand-wheel 16 fastened to a screw shaft 17 (Fig. 2) which is journalled in bearings carried by the guide and has threaded engagement with a portion carried by the plate.

The guide 15 on which the plate 14 slides is supported by a bracket 18 which is vertically slidable on a guide 19 rigidly bolted to the carriage 1 as shown at 20 (Fig. 1). Adjustment of the bracket 18 vertically on the slide 19 may be effected by turning a hand-wheel 21 fastened to a shaft 22 rotatably mounted on the bracket 18 and carrying a worm 23 which meshes with a worm wheel 24. This worm wheel is secured to a shaft 25 (see also Figs. 3 and 4) which is also journalled on the bracket 18. The shaft 25 carries a pinion 26 meshing with a stationary rack 27 on the guide 19. When the hand-wheel 21 is turned, the pinion 26 is rotated and rolls on the stationary rack 27 to adjust the bracket 18 vertically on the guide 19.

The rear end of the shaft 10 carries a gear 28 which is driven from an electric motor 29 mounted on a standard 30 attached to the transversely adjustable plate 14. The gear 28 meshes with a pinion 31 driven by the electric motor 29 through a gear reduction unit 32. The electric motor has an adjustable speed control governor 33 (Fig. 3) so that the shaft 10 may be made to rotate at a uniform speed which will cause the torch to travel at the desired cutting speed when making the circular cut in the plate.

Fuel gas, such as acetylene, and oxygen may be supplied to the torch from cylinders 38 preferably carried by the carriage 1 as shown in Fig. 1.

The carriage may also be provided, if desired, with a clamp for locking it to the track to hold the carriage stationary during the cutting operation. Such a clamp is shown at 34 (Fig. 3) and may comprise jaws 35 which are adapted to be brought into gripping engagement with one of the track rails when a hand-lever 36 is depressed.

When it is desired to cut a circular opening in the plate P, the carriage 1 is moved along the track 3 to bring the torch 4 into cutting relation with the plate. The carriage is then clamped to the track by depressing the lever 36 of the clamp 34. Fine adjustment of the torch longitudinally of itself to bring the torch tip the proper distance from the surface of the plate P may be made by adjusting the torch longitudinally in its holder 5. The shaft 10 is then adjusted vertically and horizontally by turning the hand-wheels 21 and 16 to bring the torch tip into alignment with the point on the plate about which as a center the circle is to be cut. It will be understood that at this time the longitudinal axis of the torch is in alignment with the longitudinal axis of the shaft. The hand-wheel 11 is then turned to shift the torch laterally on the guide 8 a distance equal to the radius of the circle which is to be cut in the plate. A scale 37 may be provided on the guide 8 to aid in adjusting the torch laterally the proper amount. The adjustment of the torch throws the axis of the torch out of alignment with the axis of its actuating shaft 10 and when the shaft is thereafter rotated by the electric motor 29 the torch revolves bodily about the axis of the shaft 10 and cuts a circular opening in the plate P the radius of which depends upon the amount of eccentricity of the torch with respect to the shaft, i. e., the amount that the torch has been laterally adjusted from its original position of alignment with the shaft.

In order to cut the circle at the desired place on the plate the important thing is to bring the axis of revolution of the torch tip, i. e., the axis of the actuating shaft 10, into alignment with the point on the plate about which as a center the circle is to be cut. Therefore while the bodily adjustment of the torch 4 to establish the right amount of eccentricity between the torch tip and the axis of the shaft 10 is important to make it possible to cut a circle of the desired size, nevertheless it is not absolutely essential that the torch be adjustable all the way back to the position in which the torch tip is in exact coaxial relationship with the shaft 10, provided some means such as a pointer or the like is employed to indicate when the axis of the shaft 10 has been brought into alignment with the point on the plate which is to constitute the center of the circular cut.

While the preferred form of the apparatus shown in the drawings is intended to cut in a vertical plane, it may be readily adapted for use in cutting in a horizontal plane without departing from certain aspects of the invention. Moreover, it is obvious that the apparatus is not limited in use to cutting an opening in a plate or other work-piece. In some cases, as in trimming a circular flange, the torch may describe a complete circle during the cutting operation but an opening is not necessarily produced except perhaps in the waste piece. Furthermore, the circular cut may be limited in extent to an arc of a circle, and such arc may be the complete cut or may constitute a portion only of an irregular cut. For instance, it may be desirable in making the cut to first move the torch radially inward toward the center of the proposed arcuate cut by turning the hand wheel 11, and then revolve the torch bodily about the axis of the shaft 10 to effect the arcuate cut. This may be followed by radial outward movement of the torch away from the center of the arcuate cut. Such a procedure could be used in notching the peripheral portion of a circular flange to leave spaced protuberances that extend radially to the original diameter of the flange.

I claim:

1. Apparatus for making circular cuts in vertical metal plates comprising a carriage movable toward and away from the plate to be cut, a rotatable shaft mounted on the carriage so that its axis is disposed substantially at right angles to the vertical face of the plate, a tool connected to said shaft and having its end directed toward the vertical face of the plate, means for adjusting the tool laterally with respect to the shaft, means for adjusting said shaft vertically on the carriage, means for adjusting said shaft horizontally on the carriage, and means operative in any adjusted position of said shaft for rotating it to revolve the tool bodily about the axis of the shaft.

2. Apparatus for making circular cuts in vertical metal plates comprising a carriage which is movable toward and away from the plate to be cut, a vertically adjustable bracket supported by the carriage, a horizontally adjustable member supported by said bracket, a rotatable shaft supported by said member so that its axis is disposed substantially at right angles to the vertical wall of the plate to be cut, a bracket secured to said shaft, a tool carried by the bracket and having its end directed toward the vertical wall of the plate, means for adjusting the tool laterally on said bracket, a gear secured to the rear end of said shaft, and a motor supported by said member and operatively connected to said gear to rotate the shaft and thereby revolve the tool bodily about the axis of the shaft.

JAMES L. ANDERSON.